United States Patent [19]

Hock

[11] Patent Number: 5,745,028
[45] Date of Patent: Apr. 28, 1998

[54] DIRECTIONAL MOTION INSTRUMENTATION SYSTEM

[75] Inventor: Allan G. Hock, Londonderry, N.H.

[73] Assignee: Sound Motion, Inc., Londonderry, N.H.

[21] Appl. No.: 235,486

[22] Filed: Apr. 29, 1994

[51] Int. Cl.$^6$ .................................................. G08B 23/00
[52] U.S. Cl. .................... 340/323 R; 340/665; 340/669; 340/384.6; 73/1 DV; 73/379.01; 73/DIG. 4
[58] Field of Search ........................ 340/323 R, 665, 340/669, 384.6, 689; 273/187.2; 73/1 D, 1 DV, 1 E, 379.01, DIG. 4

[56] References Cited

U.S. PATENT DOCUMENTS

| | | | |
|---|---|---|---|
| 2,064,603 | 12/1936 | Harrison . | |
| 3,791,375 | 2/1974 | Pfeiffer | 128/2.1 |
| 4,492,246 | 1/1985 | Prescott et al. | 137/85 |
| 4,502,035 | 2/1985 | Obenauf et al. | 340/323 R |
| 4,821,218 | 4/1989 | Pötsch | 340/689 |
| 5,099,702 | 3/1992 | French | 73/862.08 |
| 5,226,417 | 7/1993 | Swedlow et al. | 128/633 |
| 5,304,206 | 4/1994 | Baker et al. | 607/2 |
| 5,315,289 | 5/1994 | Fuller et al. | 340/523 |
| 5,317,305 | 5/1994 | Campman | 340/573 |
| 5,376,925 | 12/1994 | Crisafulli et al. | 340/683 |
| 5,380,001 | 1/1995 | Socci et al. | 273/26 R |
| 5,430,435 | 7/1995 | Hoch et al. | 340/689 |

*Primary Examiner*—Jeffery Hofsass
*Assistant Examiner*—Nina Tong
*Attorney, Agent, or Firm*—Cesari and McKenna, LLP

[57] ABSTRACT

A training system for monitoring kinetic activities of an individual uses one or more transducers that are highly directionally sensitive to detect certain characteristics of a user's activity, such as motion, direction of motion, distance, velocity, and the like. The sensors have a housing which includes an acceleration-responsive transducer and circuitry responsive to output signals from the transducer to provide an indication to the user of certain characteristics of the activity. In a preferred embodiment, the sensor has a pointer indicating the direction of maximum sensitivity of the transducer, so that the user can orient it to preferentially detect motion in certain directions. The output signal supplied to the user preferably comprises a tone having one of several discrete frequencies corresponding to discrete range intervals of the transducer output.

1 Claim, 5 Drawing Sheets

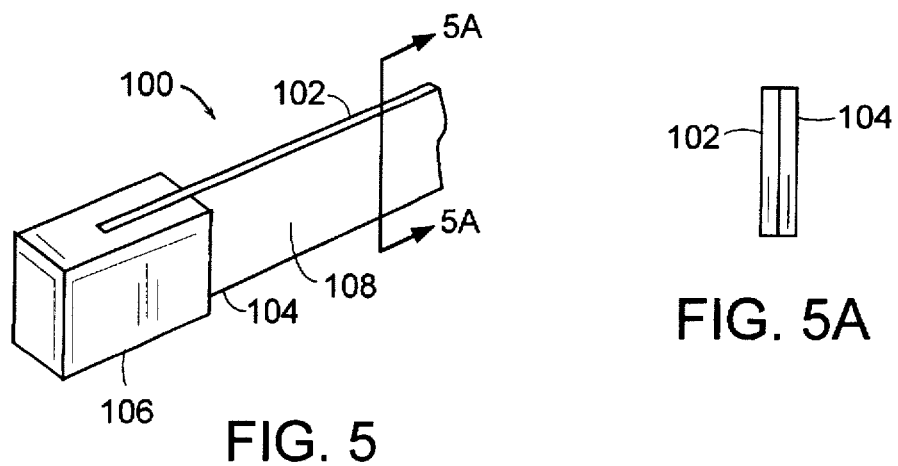
FIG. 5
FIG. 5A
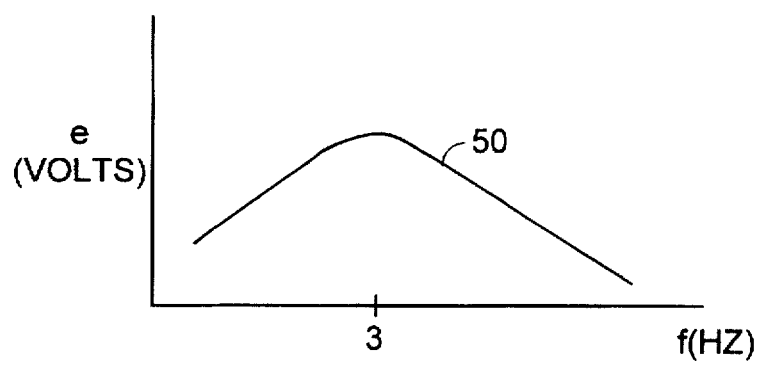
FIG. 4
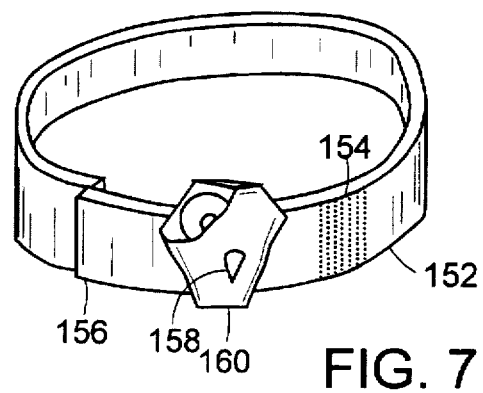
FIG. 7

DIRECTIONAL MOTION INSTRUMENTATION SYSTEM

BACKGROUND OF THE INVENTION

A. Field of the Invention

The invention relates to motion instrumentation systems for kinetic activities such as golf, tennis, baseball, and the like. In particular, it comprises a motion instrumentation system having directional sensitivity and controllable response for sensing motion characteristics such as distance, velocity and acceleration.

B. Prior Art

Motion sensors for kinetic activities such as golf, tennis and the like have long been known. For example, Harrison, U.S. Pat. No. 2,064,603 describes a motion sensor which can be mounted on the wrist of a golfer to detect certain characteristics relating to the swing. Pfeiffer, U.S. Pat. No. 3,791,375 describes a sensor attached to a user's foot in order to detect excessive force placed on the foot during motion. Obenauf, U.S. Pat. No. 4,502,035, describes a motion sensor that is mounted to the hat of a golfer for providing audible tones to a headphone worn by the golfer, the tones indicating characteristics of the golfer while swinging the club.

Numerous other kinetic sensors are described in various patents to provide information concerning a user's kinetic activities. The multiplicity of proposals for such sensors, and the limited availability of such sensors in the commercial market, demonstrate both the need for a convenient, reasonably priced, informationally-useful sensor and the apparent difficulty of realizing this goal. The present application is directed to such a sensor.

BRIEF DESCRIPTION OF THE INVENTION

In accordance with the present invention, I provide a highly directional motion instrumentation system for use in kinetic activities, principally sports, but applicable to other activities, such as piano playing, as well. The system is formed from one or more direction-sensitive transducers for mounting on the body of a wearer. The transducers are relatively small, lightweight and readily mountable on the body of a user to detect various aspects of the user's movement, e.g. motion, direction of motion, distance, velocity, acceleration, etc.

The transducer described herein is highly directionally responsive. In particular, it provides a maximum signal in response to acceleration transverse to the planar face of the transducer, and minimum response in other directions. Thus, the system is excellent in isolating the motion to be studied, and in rejecting motion along axes transverse to this direction.

The transducers are mounted on the body of a user preferably by means which allows readily varying the orientation of the transducer directional axis with respect to the user. The directional axis is the axis along which the transducer of the present invention has its greatest sensitivity to motion. In the preferred embodiment described herein, the transducer is on the order of 90% directional, that is, the transducer is approximately nine times as sensitive to motion along its directional axis than it is to motion transverse to that axis.

The transducer of the present invention is preferably formed from a rectangular strip of Kynar piezoelectric film laminated to a thin slab of plastic material of corresponding shape and mounted in cantilever fashion. In particular, the directionally-sensitive transducer described herein is formed from a Kynar piezoelectric film that is approximately 1⅛ inches long; 0.42 inches wide; and 0.005 inches thick. It is adhesively secured to a strip of Mylar material that is 0.010 inches thick, and of a length and width the same as that of the piezoelectric material.

The resultant laminate is mounted in cantilever-fashion to a mounting block secured to the transducer housing. The transducer has a resonant frequency on the order of from 20 to 40 Hz. This provides a signal of sufficient strength as to enable the requisite signal processing to be performed by electronics of reasonable complexity, bulk and cost. It covers the frequency range of interest in many applications, such as in sensing golf strokes and the like. The transducer may be shifted to a higher resonant frequency, e.g. on the order of from 100 to 200 Hz, by "loading" the transducer, e.g. by applying adhesive paste to it to increase its moment of inertia and thus its resonant frequency. However, this is achieved at the expense of reducing its sensitivity. This may, nonetheless, be acceptable for applications such as measuring a baseball swing or substantial acceleration occurs.

The transducer may be mounted on a user by a variety of means. For example, the transducer may be mounted on a rotatable clamp that is in turn mounted on the body of a user, or may be attached to a ball and socket mount that in turn is mounted on the user's body, and the like. Preferably, however, in accordance with the preferred embodiment described herein, the transducer uses an interlocking hook attachment of the kind manufactured and sold under the trademark "Velcro™". This allows secure attachment of the transducer to the user, but enables rapid detachment and repositioning as necessary. Thus, the user can test various orientations of the transducer, and various locations for the transducer, so as to achieve optimum performance for a particular activity.

A number of bands and other mounts are provided for facilitating mounting of the transducer on the user. One such mount is a generally cylindrical band, of a size appropriate for mounting on specific parts of a body such as the wrist, the waist, the forehead, the ankle and the like, and having provided thereon a hook-type (Velcro) surface for mating with a corresponding hook-type surface provided on a face of the transducer. The mount may take the form of a band that is specifically sized for the body part to which it is to be attached, for example, in the manner of a belt with a fastener to set it to the desired size; or may take the form of a resilient, stretchable band which can be stretched around the body part, e.g. a headband or a wristband. Additionally, patches of material containing a hook-type fastener on one surface thereof may be provided for attachment to the clothing of a user. These may be mounted on the clothing by sewing, by adhesive, or by other known means.

DETAILED DESCRIPTION OF THE INVENTION

Accordingly, it is an object of the invention to provide directional motion instrumentation for use in kinetic activity to help improve performance of the user.

Further, it is an object of the invention to provide a motion instrumentation system for kinetic activities which is directionally sensitive and which provides an indication of motion in a particular direction to the user.

Yet another object of the invention is to provide a directional motion instrumentation system which is readily affixed to the body of the user.

The foregoing and other and further objects and features of the invention will be more readily understood from the following detailed description of the invention, when taken in conjunction with the accompanying drawings, in which:

FIG. 4 is a diagram of the response of the circuit of FIG. 2 showing motion discrimination at differing frequency bands;

FIG. 5 is a pictorial view of a transducer of a cantilever transducer used in the present invention;

FIG. 7 is a sketch of various mounting elements used to attach the transducer modules to the body of a user in accordance with the present invention.

Figure 1:
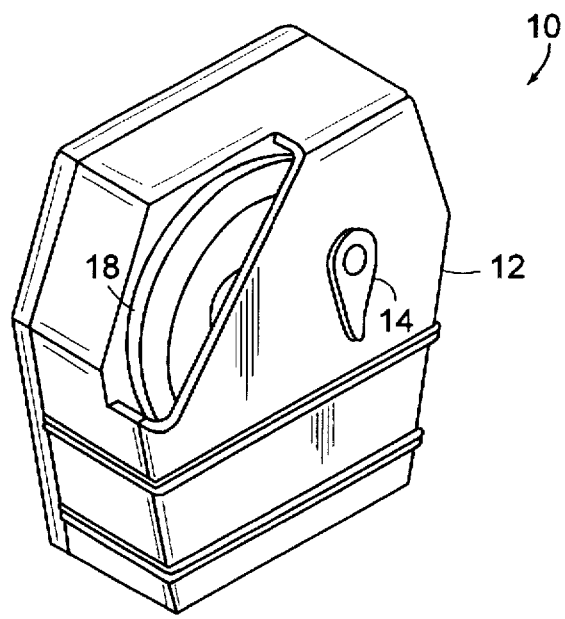
FIG. 1 is a view in perspective of a transducer module in accordance with my invention.
Figure 2:
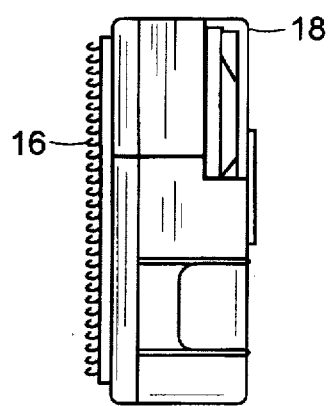
FIG. 2 is a side view of the transducer of FIG. 1 showing a preferred form of mounting.

Turning now specifically to FIGS. 1 and 2, a transducer module 10, in accordance with the present invention, has a housing 12 having a directional indicator 14 on the front face thereof and a pad of a Velcro hook-type material 16 bonded to the rear face thereof to enable attachment to a user. The indicator 14 indicates the direction of maximum sensitivity of the transducer and is pointing downwardly, that is, the vertical direction in FIG. 1. A rotatable thumbwheel 18 on the module provides means by which the user can set the sensitivity of the module as described in more detail hereinafter.

Figure 3A:
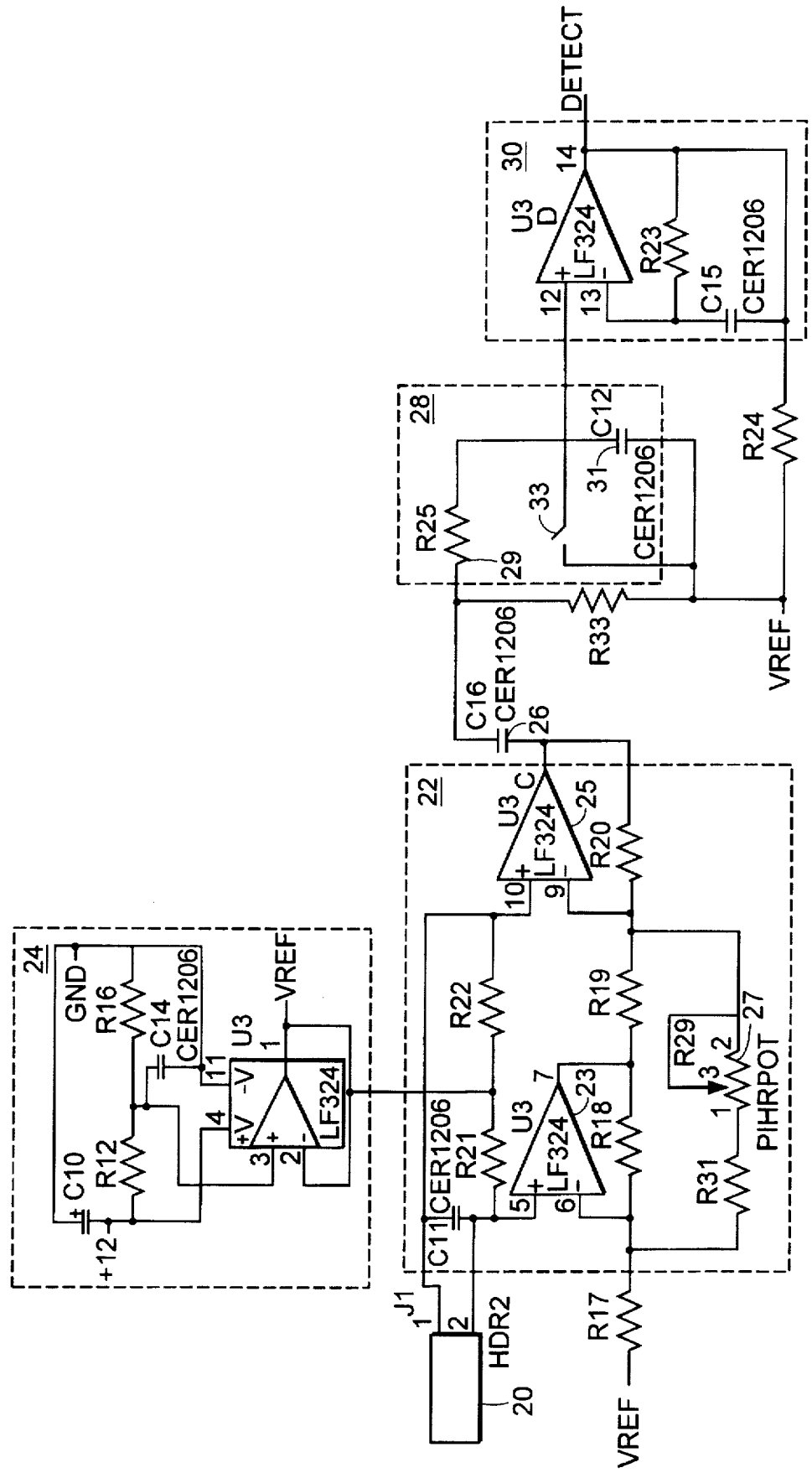
FIG. 3 is a schematic diagram of a signal processing circuit contained within the module of FIG. 1.
Figure 3B:
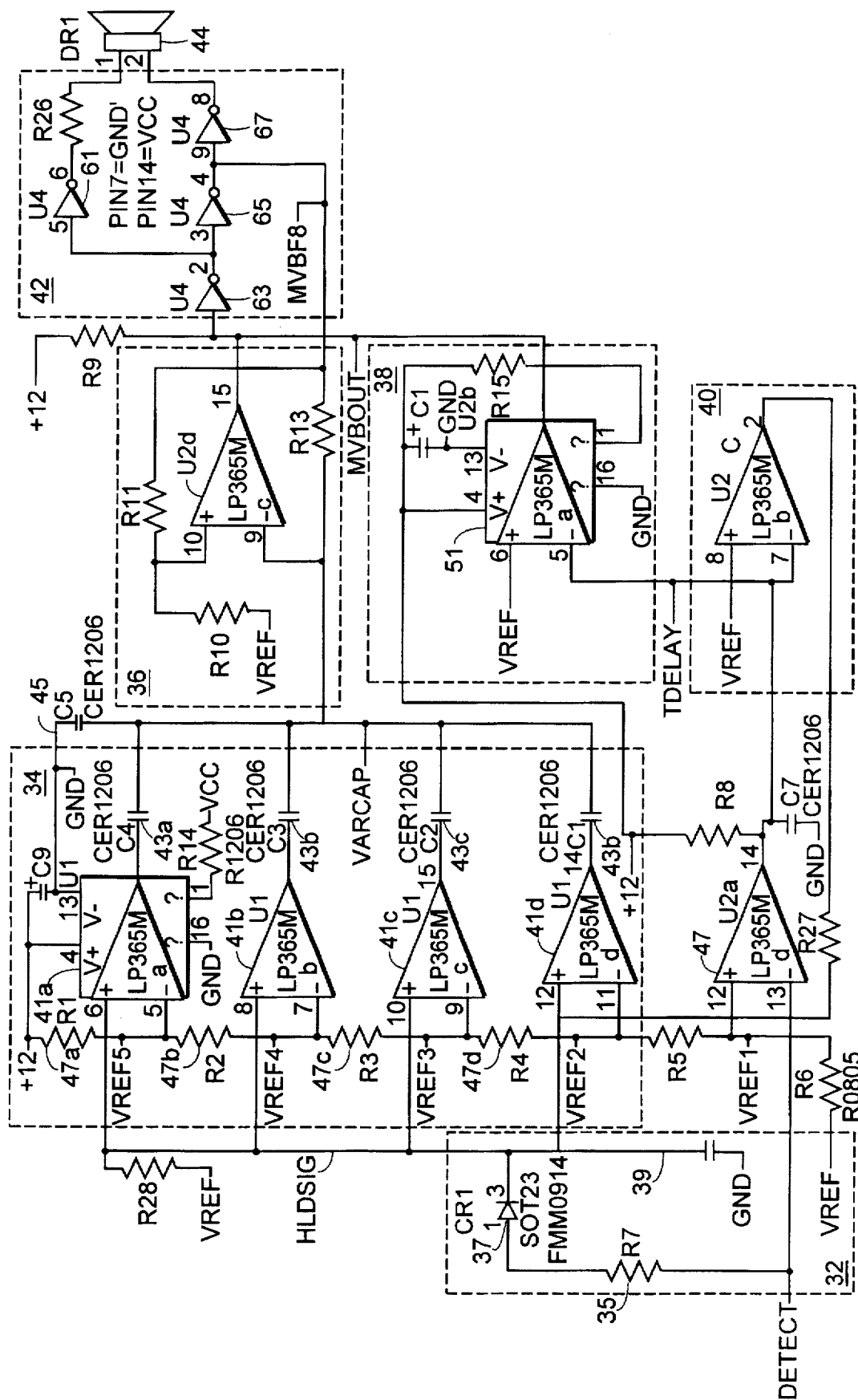

Turning now to FIG. 3, a motion sensor 20 (described in more detail in FIG. 5), generates an electrical signal when a transverse acceleration is applied thereto. This signal is applied to an amplifier 22 having integrated circuit amplifier elements 23, 25 provided therein. A variable resistor 27 responds to settings of the gain control 18 of FIG. 1 to change the gain of the amplifier 22. A voltage reference source 24 provides a stable reference voltage, $V_{ref}$, to amplifier 22. The output of amplifier 22 is applied through a coupling capacitor 26 to an integrator 28 formed from a resistor 29 and a capacitor 31. A switch 33, normally open, shunts capacitor 31 when closed.

The output of integrator 28 drives a buffer-amplifier circuit 30 which generates a signal, "DETECT", that indicates that a detectable signal is present. The DETECT signal in turn is applied to a peak detector 32 formed from a resistor 35, diode 37, and capacitor 39. The voltage on capacitor 39 in turn is applied to a threshold ladder 34. The ladder is formed from associated pairs of integrated circuit amplifier elements 41a–41d and capacitors 43a–43d.

A resistor chain 47a–47d provides differing reference voltages to amplifiers 41a–41 d. The reference voltages are compared in the respective amplifiers with the voltage on capacitor 39 and the amplifiers switch to selectively connect capacitors 43 in series with an oscillator 36 in accordance with the relative values of the respective voltages. Capacitors 43a–43d and 45 control the frequency of oscillator 36. Thus, dependent on the magnitude of the motion detected by the transducer 20, one or more of the capacitors 43 and 45 are switched into series connection with the oscillator 36 to set the frequency of this oscillator at one of five discrete frequencies indicative of five different levels of motion of the transducer that may be indicated. Of course, a larger or smaller number of frequencies and thus levels, may be provided for.

The DETECT signal is also applied via an amplifier 47 to a threshold detector 38 containing an integrated-circuit amplifier element 51. Detector 38 is connected to block oscillation of oscillator 36 until the DETECT signal is sufficiently large to indicate the presence of a meaningful signal. Further, the DETECT signal is connected to a squelch circuit 40 which discharges capacitor 39 after a predefined time interval (e.g., one-half second) so as to limit the duration of the resultant oscillation.

Oscillator 36 drives a speaker driver 42. In the configuration shown, the driver contains inverting amplifiers 61–67 which double the driving voltage applied to an output element, here shown as a speaker 44.

In addition to providing a multiplicity of audible tones indicative of differing levels of motional intensity, the circuit of FIG. 3 provides differing response to signals in two different portions of the frequency band. In particular, coupling capacitor 26, because of its series connection, provides a differentiation function, that is, it emphasizes high frequencies in the signals passed through it. Conversely, integrator 28 smooths or integrates the high frequencies. The form of the resultant signal is shown in FIG. 4 which is a gain vs. frequency diagram 50 of the differentiator/integrator path. In accordance with the preferred embodiment of the present invention, in a low-velocity version thereof, the break point 102 of the curve 100 is set at approximately 3 Hz. Below this frequency, the system effectively emphasizes fast movements, while, above this frequency, the system emphasizes slow movements. This arrangement is particularly useful for detecting undesired motion, such as the sudden jerk of a head, in certain activities such as putting in golf. Its operation is such that when one has adequate signal, e.g. when normally putting, the integrator contribution will be emphasized; however, in the absence of such a signal, any sudden jerk will be emphasized. Thus, the circuit provides a measure of differentiation between smooth, steady signals and fast, nonrepetitive signals.

Turning now to FIG. 5, the transducer element used in the present invention is shown in more detail. The transducer comprises a piezoelectric strip 102 laminated to a flexible beam 104 of similar dimensions but greater thickness. The resultant composite beam is fixed in a mounting block 106. When a force is applied to the beam in a direction transverse to the major planar face of the beam, e.g. in the direction of the arrow 108, it provides a small, but measurable, electrical differential across electrodes connected to opposed faces of the piezoelectric element. This signal, when processed as described above, provides audible feedback to the user to inform the user of his or her performance during kinetic activity such as sports or other activities.

Figure 6:
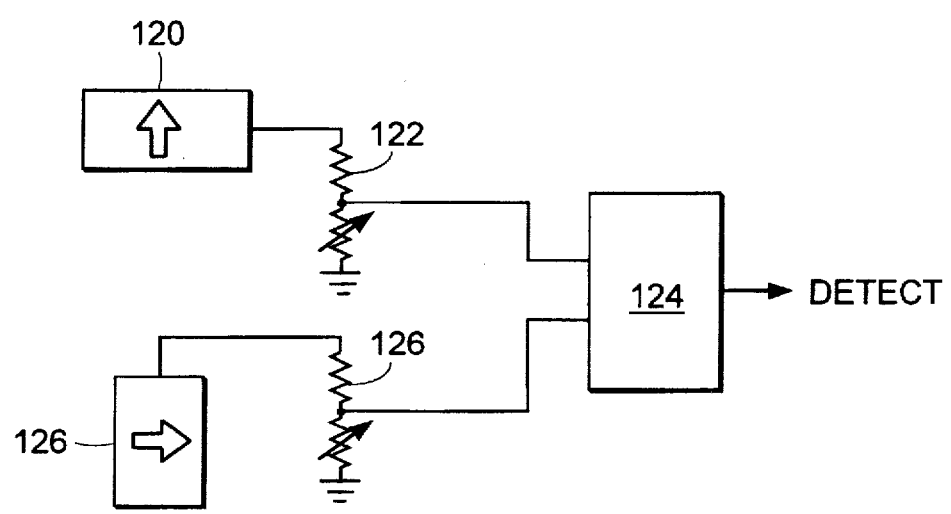
FIG. 6 is a schematic diagram of a combiner for combining the signals of two or more transducer modules.

The transducer of the present invention may be used singly or as part of a multiple-transducer system. For example, one transducer may be mounted on the user's body to provide information concerning motion of the user in a first direction, and another such transducer may be mounted on the user's body to provide information concerning motion in a different direction. These transducers may be independent of each other, and provide different sounds in order to differentiate the motion in the different directions. Alternatively, their outputs may be combined to form a single composite input to drive the audio signal generator. An example of a combiner circuit useful for this purpose is shown in FIG. 6 in which a first transducer 120, oriented in a first direction, applies its output through a divider circuit 122 to one input of an amplifier 124. Similarly, a second transducer 126, which is oriented along a direction different from that of transducer 120 (in FIG. 5, the direction of transducer 126 is shown as orthogonal to that of transducer 120) provides its output through a divider circuit 126 to a second input of amplifier 124. The resultant transducer inputs are combined in amplifier 124 and thereafter processed as described previously, i.e. they are applied as the DETECT input to the circuitry of FIG. 3B.

The DETECT signal is indicative of the integral of the acceleration applied to the sensor 20, that is, to its velocity. By closing switch 33, capacitor 31 may be shorted and the integrator formed by this capacitor thereby removed from the circuit. The DETECT signal can thereby be made indicative of the acceleration applied to the sensor 20. Thus, the transducer can readily be set to provide a variety of differing data concerning motion of the user.

The transducers of the present invention may be mounted on any part of the body whose motion is to be studied. For this purpose, they may be attached to an intermediate mount which in turn is attached to the body. One form of mount is shown in FIG. 7. As shown therein, a band or strap 152 has a hook-receiving surface 154 formed in at least part of the outer face of the strap, and preferably all around the outer face of the strap. An inner face 156a of one end of the strap, and an outer face 156b of the other end of the strap, also has a Velcro hook-type material so that the strap can be adjustably secured around a portion of the user's body, such as the wrist. Preferably, the strap comprises a resilient, stretchable material so as to securely accommodate varying body sizes. A transducer 158 in accordance with the invention is mounted on the strap 152. Because of the Velcro hook-type material, the transducer can be mounted with its directional indicator 160 pointed in any direction. Here, it is shown with the directional indicator pointed downwardly, that is, in the vertical direction. Thus, motion along this axis will be most readily detected.

CONCLUSION

From the foregoing, it will be seen that I have provided a directional motion indicating system that is compact, easy to use, and that can be attached to a user's body in a variety of manners and with a variety of orientations so as to best enable the user to measure various motions. The detector provides a multiplicity of audible tones for informing the user of the direction and magnitude of motion undertaken at various times. A sensitivity adjustment allows the user to set the gain of the system so that the extent of various motions as measured by the system may be suppressed or enhanced. Thus, the user can readily select both the direction of motion, and the sensitivity of response to motion in this direction.

The foregoing description has been limited to a specific embodiment of this invention. It will be apparent, however, that variations and modifications may be made to the invention, with the attainment of some or all of its advantages. Therefore, it is the object of the appended is claims to cover all such variations and modifications as come within the true spirit and scope of the invention.

What is claimed is:

1. A training system for kinetic activities, comprising:
    a transducer for mounting on a user, said transducer adapted to provide a first signal responsive to acceleration applied thereto as said user engages in said activity,
    means responsive to said first signal for generating an output signal indicating to said user a specific range, among a selected plurality of ranges, in which a characteristic of said first signal is located, to thereby enable said user to monitor said activities, wherein said means for generating includes motion distinguishing means having a frequency response characterized by a rising slope over a first portion thereof and a falling slope over a second portion thereof, for distinguishing between smooth steady signals and fast, non-repetitive signals and including a differentiator for providing said rising slope and an integrator for providing said falling slope.

\* \* \* \* \*